F. L. MORSE.
HARDNESS TESTING MACHINE.
APPLICATION FILED JUNE 26, 1914.

1,255,913.

Patented Feb. 12, 1918.
3 SHEETS—SHEET 3.

WITNESSES
A. B. Fowler.
J. V. Flanagan

INVENTOR
Frank L. Morse.
BY
Edward A. Wright
ATTORNEY

UNITED STATES PATENT OFFICE.

FRANK L. MORSE, OF ITHACA, NEW YORK.

HARDNESS-TESTING MACHINE.

1,255,913.           Specification of Letters Patent.     Patented Feb. 12, 1918.

Application filed June 26, 1914. Serial No. 847,387.

*To all whom it may concern:*

Be it known that I, FRANK L. MORSE, a citizen of the United States, residing at Ithaca, in the county of Tompkins and State of New York, have invented a certain new and useful Improvement in Hardness-Testing Machines, of which improvement the following is a specification.

This invention relates to machines or instruments for measuring the hardness of metals or other materials, and has for its object to provide an improved device for this purpose, in which the hardness may be indicated by a direct reading upon a scale, and all errors due to irregularities or deflection of the machine under pressure shall be eliminated.

The essential features of my improvement comprise an abutment for supporting the material to be tested, a movable plunger, a projection for indenting the material, and means for registering or indicating the differential movement between said abutment and plunger when pressure is applied to indent the material. The abutment may also be yieldingly supported, as by a spring, and the deflection of the abutment, or its movement relative to a fixed point, may be utilized to indicate the total pressure applied to the plunger. It is of, course, necessary to subject different metals or materials to different pressures in making tests for hardness, and a table of suitable pressures for the respective metals and materials should be compiled, from which observations and tests may be made.

Figure 1:
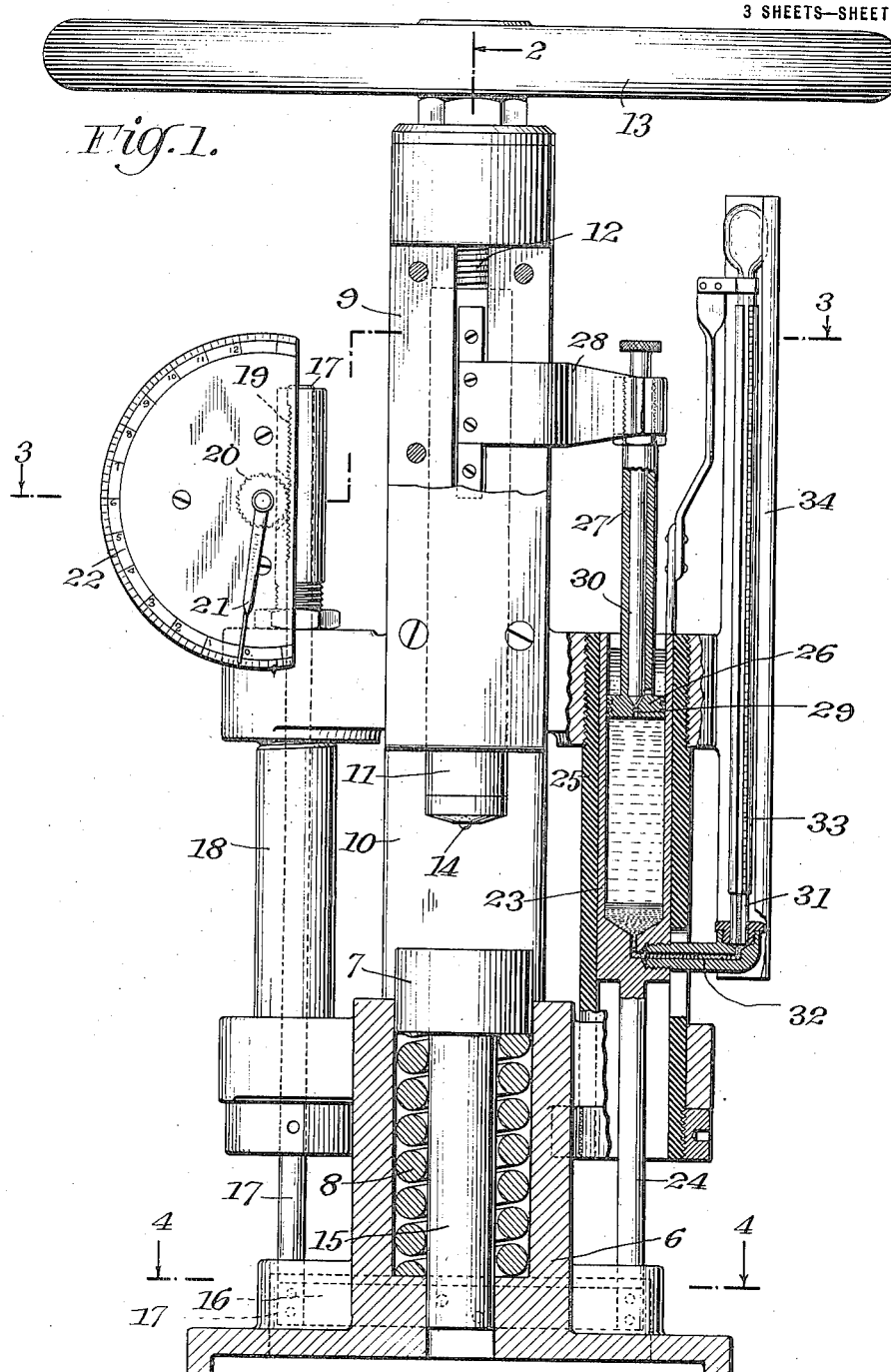
Figure 2:
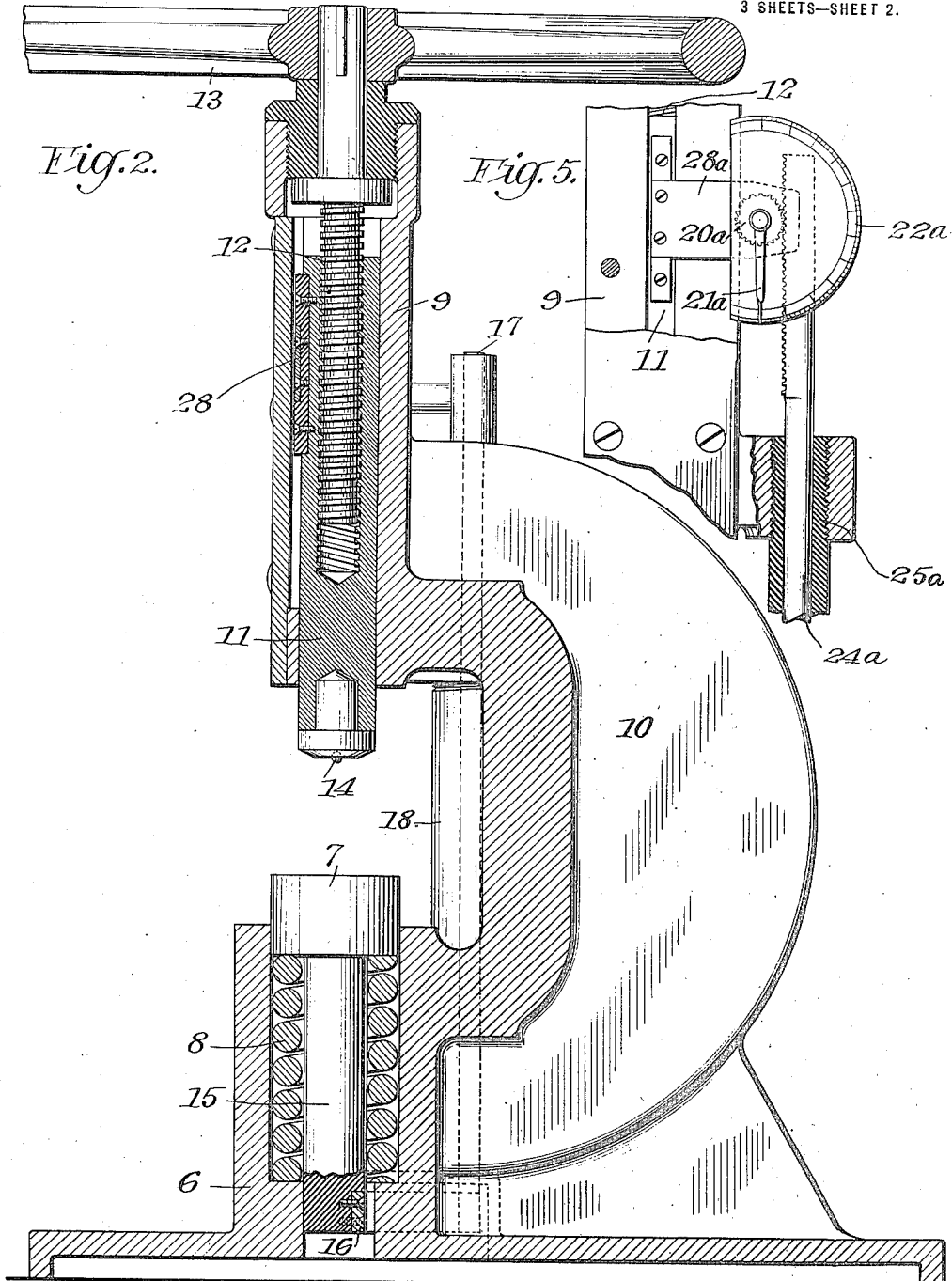
Figure 3:
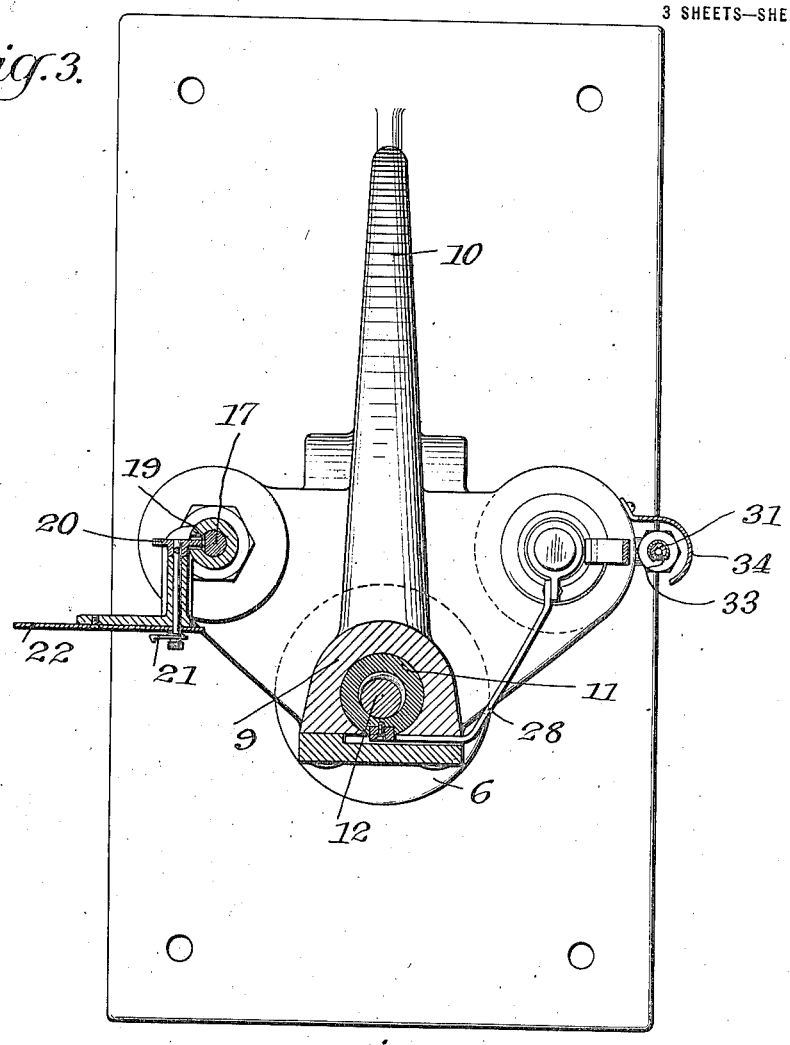
Figure 4:
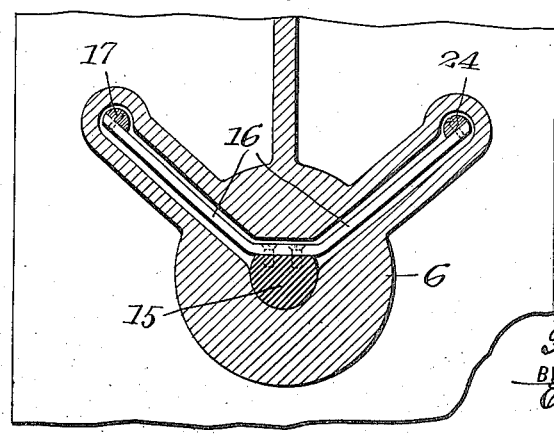

In the accompanying drawings: Figure 1 is a front elevation, with certain parts indicated in vertical section, of an instrument embodying my improvement; Fig. 2, a vertical section taken substantially on the line 2—2 of Fig. 1; Fig. 3, a horizontal section taken on the line 3—3 of Fig. 1; Fig. 4, a horizontal section taken on the line 4—4 of Fig. 1; and Fig. 5, a fragmentary view, in elevation, and section, showing a modified form of hardness indicating device.

According to the construction shown in the drawings, the instrument or machine comprises a frame having a base portion, 6, in which is mounted the yielding abutment, 7, resting on a spring, 8, while the head, 9, of the frame is supported by an arm, 10, and carries the sliding plunger, 11, arranged in line with the abutment, 7. The plunger is adapted to be applied with pressure to the abutment, or material to be tested, by means of the screw, 12, mounted in the head, and operated by the hand wheel, 13. An indenting projection, or ball, 14, is carried by one of the parts, preferably the plunger, and is adapted to be forced against the metal or other material to be tested, the hardness of which will be indicated by the amount of indentation when subjected to a given pressure.

The total pressure applied will be indicated by the amount of compression of the spring, 8, or the total yielding movement of the abutment with reference to a fixed point of the frame and various means may be employed for registering this movement. As shown in the drawings, the stem, 15, of the abutment, 7, is rigidly connected by the radial bar, 16, with the vertically movable rod, 17, which extends through the hollow guide bolt, 18, and is provided with rack teeth, 19, meshing with pinion, 20, mounted to turn the arm, 21, over the scale, 22, and thereby indicate the total amount of pressure applied to the material tested.

The hardness of the metal or material tested is shown by the amount of indentation by the ball or projection, 14, which is indicated by the differential movement between the plunger and the abutment when the pressure is applied. Various means may be provided for measuring this differential movement, but according to the preferred construction, as shown in Fig. 1, I provide a movable cylinder, 23, rigidly connected to one of the parts, such as the abutment, by means of a rod, 24, and radial bar, 16, and arranged to slide vertically within the hollow guide bolt, 25. The piston, 26, within the cylinder is rigidly connected with the other part or plunger, by means of stem, 27, and arm, 28. A by-pass port, 29, through the piston, is controlled by a valve, 30, mounted within the hollow stem, 27. A vertical glass gage or tube, 31, is rigidly attached to the cylinder and communicates with the bottom thereof through the nipple connection, 32, which extends through an opening in the side of the guide. An adjustable scale, 33, is located adjacent to the glass tube and has suitable graduations marked thereon. This scale may be in the form of a split brass tube mounted on the glass gage and adjustable vertically thereon. The cylinder is adapted to be filled with liquid, or preferably two kinds of liquid, such as mercury or other heavy liquid in the bottom, and a lighter liquid, such as oil, at the top. A shield, 34, may be supported on the frame for protecting the glass gage. The hollow guide bolts, 18 and 25, are attached between the base portion and the head of the machine, and also serve to strengthen the frame.

When the by-pass port, 29, is open, the piston, 26, is free to move down or up in the cylinder without affecting the height of the liquid in the glass gage since the liquid may then pass freely through said port from one side of the piston to the other. But when the valve, 30, is screwed down to close port, 29, the liquid cannot pass around the piston and any downward movement of said piston operates to force the liquid up into the glass gage. As the cross sectional area of the glass tube is many times less than that of the cylinder it will be seen that a slight movement of the piston will change the height of liquid in the gage a considerable amount. To test the hardness of a metal or other material, the same is placed upon the abutment, 7, and the plunger is then screwed down until the indenting ball, 14, engages the material and the pointer, 21, registers zero on the scale, 22. During this movement, which may exert a light pressure upon the spring, 8, the port, 29, is open to permit free movement of the piston, 26. The by-pass is then closed by valve, 30, and the scale, 33, adjusted with the point indicating the maximum degree of hardness at the level of the liquid in the gage. Pressure is then applied to the plunger by means of the screw until the pointer on the scale, 22, indicates the desired amount of total pressure to be employed in testing that particular class of material. During this movement, the amount of indentation by the ball, 14, upon the material will determine the amount of difference in the movement of the plunger, and the abutment, and consequently the amount of displacement of the piston, 26, in the cylinder. This movement forces upward the liquid column in the glass gage, and gives a direct reading of the hardness of the material upon the scale, 33. If there is no indentation made by the projection or ball, 14, when subjected to the desired pressure, there will be no differential in movement of the parts, and consequently no displacement of the piston in the cylinder. The column of liquid in the gage will therefore remain at the same height, indicating the maximum degree of hardness for that particular material at the pressure employed.

Other means may be employed for registering the differential in the movement of the plunger, and the abutment, as shown for instance in Fig. 5, in which the rod, 24$^a$, connected to the abutment and extending through a guide bolt, 25$^a$, is provided with rack teeth meshing with a pinion, 20$^a$, mounted on a bracket, 28$^a$, rigidly secured to the plunger 11, and carrying a scale, 22$^a$. A pointer, 21$^a$, is adjustably mounted on the shaft of the pinion for indicating the differential movement of the parts. With this construction the pointer may be set at the maximum hardness point when a light pressure has been applied and the gage hand, 21, stands at zero, then as the total pressure is applied to the plunger, the differential movement will be indicated by the hand, 21$^a$, on the scale, 22$^a$, as will be readily understood.

The indenting projection may, of course, be of any desired shape, and is made of a maximum hardness, known as 100 hard, as used in testing metals. By means of the multiplying feature of the indicating devices, a very minute movement will be clearly indicated upon the gage, and the degree of hardness read directly therefrom.

Having now described my invention, what I claim as new and desire to secure by Letters Patent is:

1. In a machine for measuring hardness, the combination of a frame, a spring, an abutment supported on said spring, a movable plunger, an indenting projection carried by one of said parts, means operated by the movement of the abutment for indicating the total pressure applied thereto, a rod rigidly secured to the abutment, and an indicating device having a cylinder attached to said rod, a piston connected to the plunger, and a gage communicating with the cylinder for indicating the amount of indentation.

2. In a machine for measuring hardness, the combination of a frame, a yielding abutment mounted therein, a plunger movably mounted in said frame in line with said abutment, means for applying pressure to said plunger, an indenting projection carried by the plunger, a rod secured to the abutment, an indicating device operated by the movement of the abutment relative to the frame, and another indicating device having a cylinder attached to said rod and a piston attached to the plunger.

3. In a machine for measuring hardness, the combination of an abutment, a movable plunger, an indenting projection carried by one of said parts, a cylinder adapted to contain liquid, a piston therein operated by the movement of said plunger, a by-pass valve for said piston, and a gage connected to said cylinder.

4. In a machine for measuring hardness, the combination of a yielding abutment, a movable plunger, an indenting projection carried by one of said parts, a cylinder rigidly connected to said abutment, a piston in said cylinder and rigidly connected to said plunger, a by-pass valve for the piston, and a glass gage connected to said cylinder.

5. In a machine for measuring hardness, the combination of a yielding abutment, a movable plunger, an indenting projection carried by one of said parts, a cylinder connected to the abutment and containing a heavy liquid at the bottom and a lighter liquid at the top, a piston in the lighter liquid operated by the movement of the plunger, and a gage communicating with the liquid at the bottom of the cylinder.

6. In a machine for measuring hardness, the combination of a frame having head and base portions, a yielding plunger mounted on said base portion, a movable plunger carried by the head portion, an indenting projection, a hollow guide bolt connecting the head and base portions, a rod connected to said abutment and extending through said hollow guide bolt, and an indicating device operated by the movement of said rod.

7. In a machine for measuring hardness, the combination of a frame having head and base portions, a yielding plunger mounted on said base portion, a movable plunger carried by the head portion, an indenting projection, a hollow guide bolt connecting the head and base portions, a cylinder operated by the movement of the abutment and extending within said hollow guide bolt, a piston in said cylinder therein connected to said plunger, and a gage connected to the cylinder.

FRANK L. MORSE.

Witnesses:
D. B. PERRY,
P. C. COLT.